United States Patent
Mao et al.

(10) Patent No.: US 8,732,834 B2
(45) Date of Patent: May 20, 2014

(54) SYSTEMS AND METHODS FOR DETECTING ILLEGITIMATE APPLICATIONS

(75) Inventors: Jun Mao, Culver City, CA (US); Bruce McCorkendale, Manhattan Beach, CA (US); Barry Laffoon, Glendale, CA (US); Abubakar Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/604,422

(22) Filed: Sep. 5, 2012

(65) Prior Publication Data

US 2014/0068767 A1    Mar. 6, 2014

(51) Int. Cl.
G06F 21/00 (2013.01)
H04L 29/06 (2006.01)

(52) U.S. Cl.
USPC ............................................. 726/23

(58) Field of Classification Search
None
See application file for complete search history.

(56) References Cited

U.S. PATENT DOCUMENTS

| 7,287,279 | B2* | 10/2007 | Bertman et al. ............. 726/23 |
| 2007/0157315 | A1 | 7/2007 | Moran | |
| 2008/0040797 | A1 | 2/2008 | Schwartz et al. | |
| 2009/0044272 | A1 | 2/2009 | Jarrett | |
| 2009/0187963 | A1 | 7/2009 | Bori | |
| 2011/0179484 | A1 | 7/2011 | Tuvell et al. | |

OTHER PUBLICATIONS

Nivedhitha Raman, et al; Systems and Methods for Repairing System Files; U.S. Appl. No. 13/420,799; filed Mar. 15, 2012.
Bruce McCorkendale, et al; Systems and Methods for Detecting Malware; U.S. Appl. No. 13/422,702; filed Mar. 16, 2012.

* cited by examiner

Primary Examiner — Gilberto Barron, Jr.
Assistant Examiner — Devin Almeida
(74) Attorney, Agent, or Firm — ALG Intellectual Property, LLC

(57) ABSTRACT

A computer-implemented method for detecting illegitimate applications may include 1) identifying an installation of an application on a computing system, 2) determining, in response to identifying the installation of the application, that at least one system file with privileged access on the computing system has changed prior to the installation of the application, 3) determining that the application is illegitimate based at least in part on a time of the installation of the application relative to a time of a change to the system file, and 4) performing a remediation action on the application in response to determining that the application is illegitimate. Various other methods, systems, and computer-readable media are also disclosed.

20 Claims, 6 Drawing Sheets

SYSTEMS AND METHODS FOR DETECTING ILLEGITIMATE APPLICATIONS

BACKGROUND

With the rise of mobile computing, consumers may now access the Internet from anywhere. Mobile computing devices such as cellular telephones, tablet computers, e-book readers, and the like have become a ubiquitous part of everyday life. However, the ability to access the Internet from these devices also brings the various dangers of the Internet to these devices. Untrusted sources for mobile applications may offer malicious applications for download. Furthermore, trusted sources, such as digital distribution platforms (or "application stores") for some mobile platforms may sometimes inadvertently host malware. Additionally, malicious web pages may exploit vulnerabilities in web browser software that may allow malware to be downloaded to a user's mobile computing device. In some cases, malware may gain root access on a user's mobile computing device, modifying system files and/or installing illegitimate applications without the user's awareness.

Traditional anti-malware techniques may attempt to combat malware by searching application package files for specific strings and/or byte code sequences. However, these traditional techniques may be costly to perform on mobile platforms. Furthermore, these traditional techniques may be ineffective because malware authors may regularly modify their malware in an attempt to circumvent commonly employed static-string-based malware-detection mechanisms. Accordingly, the instant disclosure identifies a need for additional and improved systems and methods for detecting malware.

SUMMARY

As will be described in greater detail below, the instant disclosure generally relates to systems and methods for detecting illegitimate applications by identifying applications installed in proximity to (and/or active in proximity to) unexpected changes to system files.

In one example, a computer-implemented method for detecting illegitimate applications may include 1) identifying an installation of an application on a computing system, 2) determining, in response to identifying the installation of the application, that at least one system file with privileged access on the computing system has changed prior to the installation of the application, 3) determining that the application is illegitimate based at least in part on a time of the installation of the application relative to a time of a change to the system file, and 4) performing a remediation action on the application in response to determining that the application is illegitimate.

In some examples, identifying the installation of the application on the computing system may include identifying an update of the application on the computing system. In one example, determining that the system file has changed may include 1) identifying a plurality of computing systems and 2) determining that the application was installed on each of the plurality of computing systems following a system file change on each of the plurality of computing systems. In this example, determining that the application is illegitimate may further be based on determining that the application was installed on each of the plurality of computing systems.

In some embodiments, determining that the system file has changed may include determining that the system file has changed without a legitimate system update to the system file. Additionally or alternatively, determining that the system file has changed may include 1) storing an attribute of the system file prior to the installation of the application and 2) identifying a current state of the attribute of the system file and determining that the attribute has changed subsequent to storing the attribute but prior to the installation of the application. In one example, determining that the system file has changed may include determining that the system file has changed prior to the installation of the application by comparing an application installation history with a system file history.

In some examples, the computer-implemented method may further include 1) determining that an additional application was installed prior to the change to the system file and 2) determining, based at least in part on determining that the additional application was installed prior to the change to the system file, that the additional application caused the change to the system file and the installation of the application. In some embodiments, determining that the application is illegitimate may further be based on an activity level of the application relative to the time of the change to the system file.

In one embodiment, a system for implementing the above-described method may include 1) an identification module programmed to identify an installation of an application on a computing system, 2) a change module programmed to determine, in response to identifying the installation of the application, that at least one system file with privileged access on the computing system has changed prior to the installation of the application, 3) a determination module programmed determine that the application is illegitimate based at least in part on a time of the installation of the application relative to a time of a change to the system file, and 4) a remediation module programmed to perform a remediation action on the application in response to determining that the application is illegitimate. The system may also include at least one processor configured to execute the identification module, the change module, the determination module, and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an installation of an application on a computing system, 2) determine, in response to identifying the installation of the application, that at least one system file with privileged access on the computing system has changed prior to the installation of the application, 3) determine that the application is illegitimate based at least in part on a time of the installation of the application relative to a time of a change to the system file, and 4) perform a remediation action on the application in response to determining that the application is illegitimate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
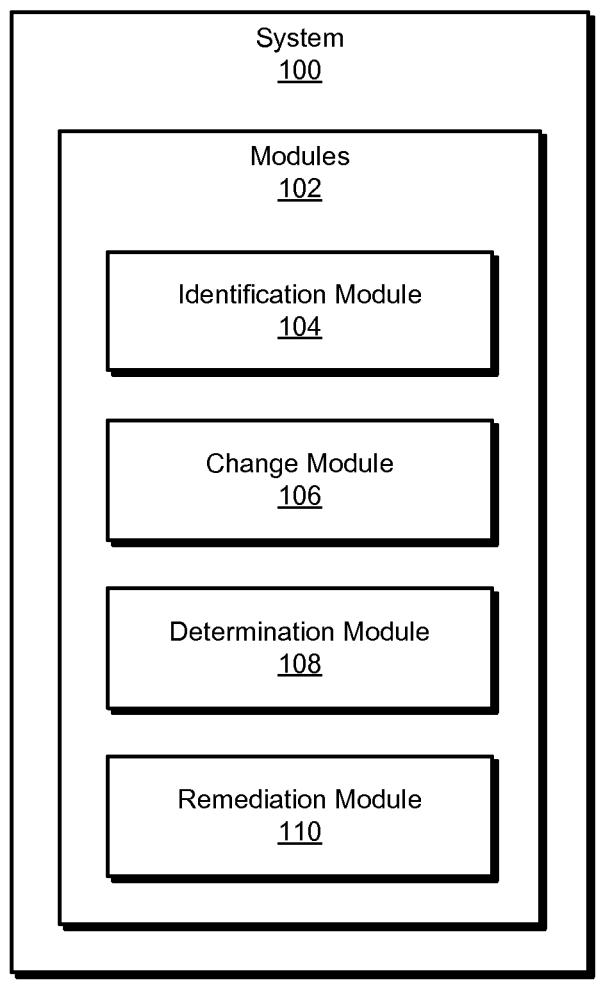
FIG. 1 is a block diagram of an exemplary system for detecting illegitimate applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting illegitimate applications. As will be explained in greater detail below, by identifying applications installed in proximity to (and/or active in proximity to) unexpected changes to system files, the systems and methods described herein may identify malicious applications that may be installed without a user's knowledge and/or without detection by traditional signature-based and/or heuristic methods for identifying malware. Additionally or alternatively, in some examples these systems and methods may identify a malicious rooting of a computing system and/or a malicious application that enabled the malicious rooting, thereby leading to the installation of additional illegitimate applications.

Figure 2:
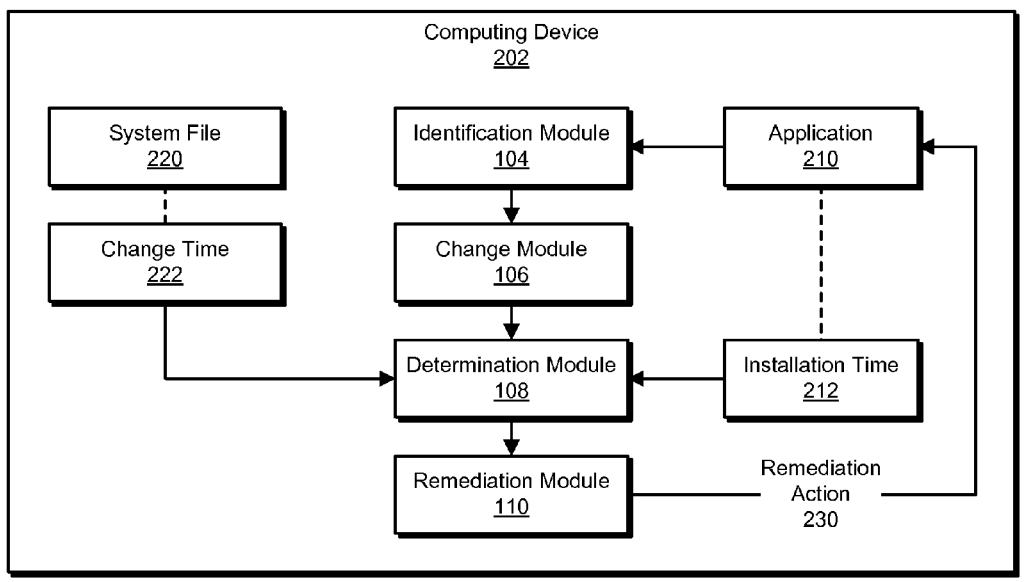
FIG. 2 is a block diagram of an exemplary system for detecting illegitimate applications.
Figure 3:
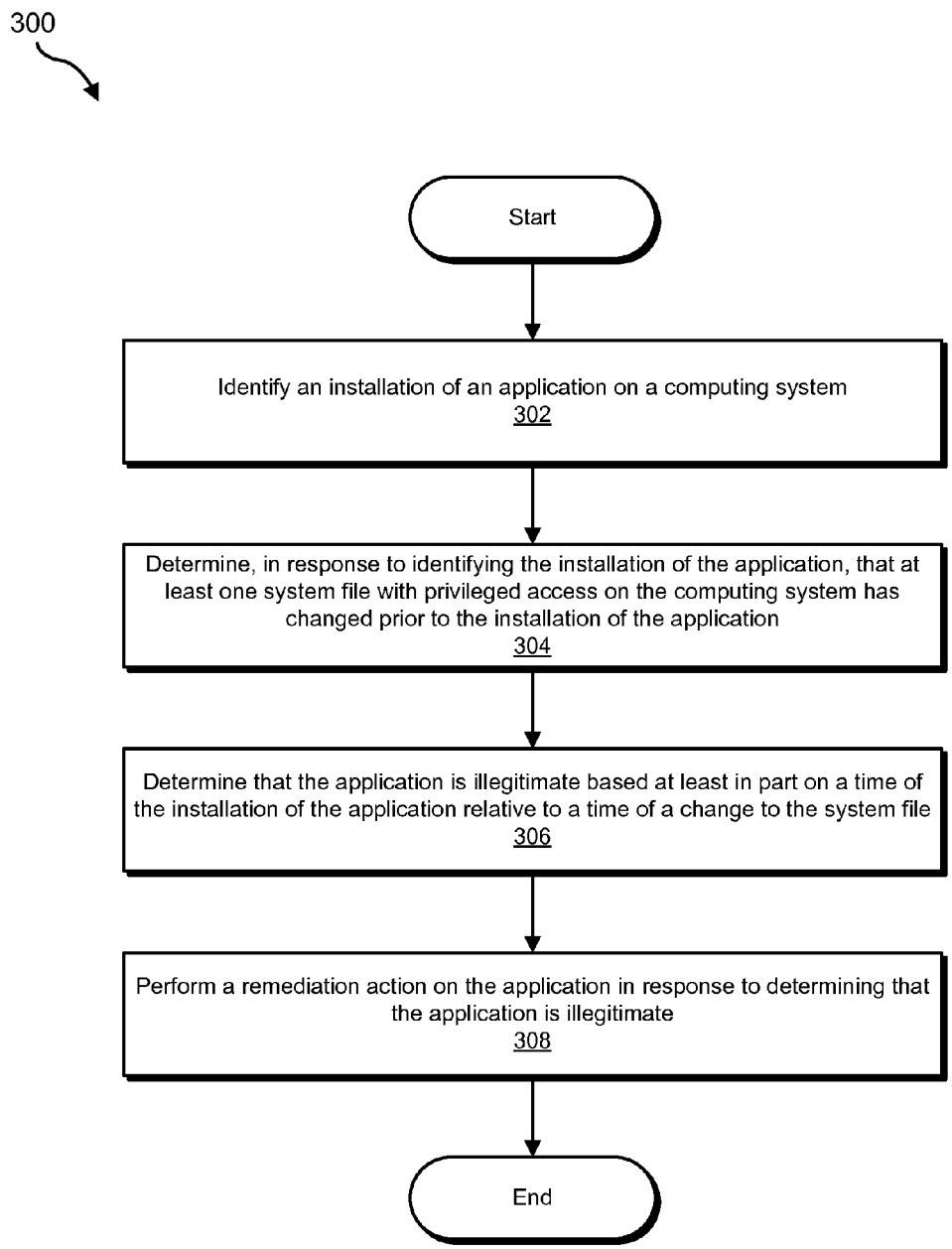
FIG. 3 is a flow diagram of an exemplary method for detecting illegitimate applications.
Figure 4:
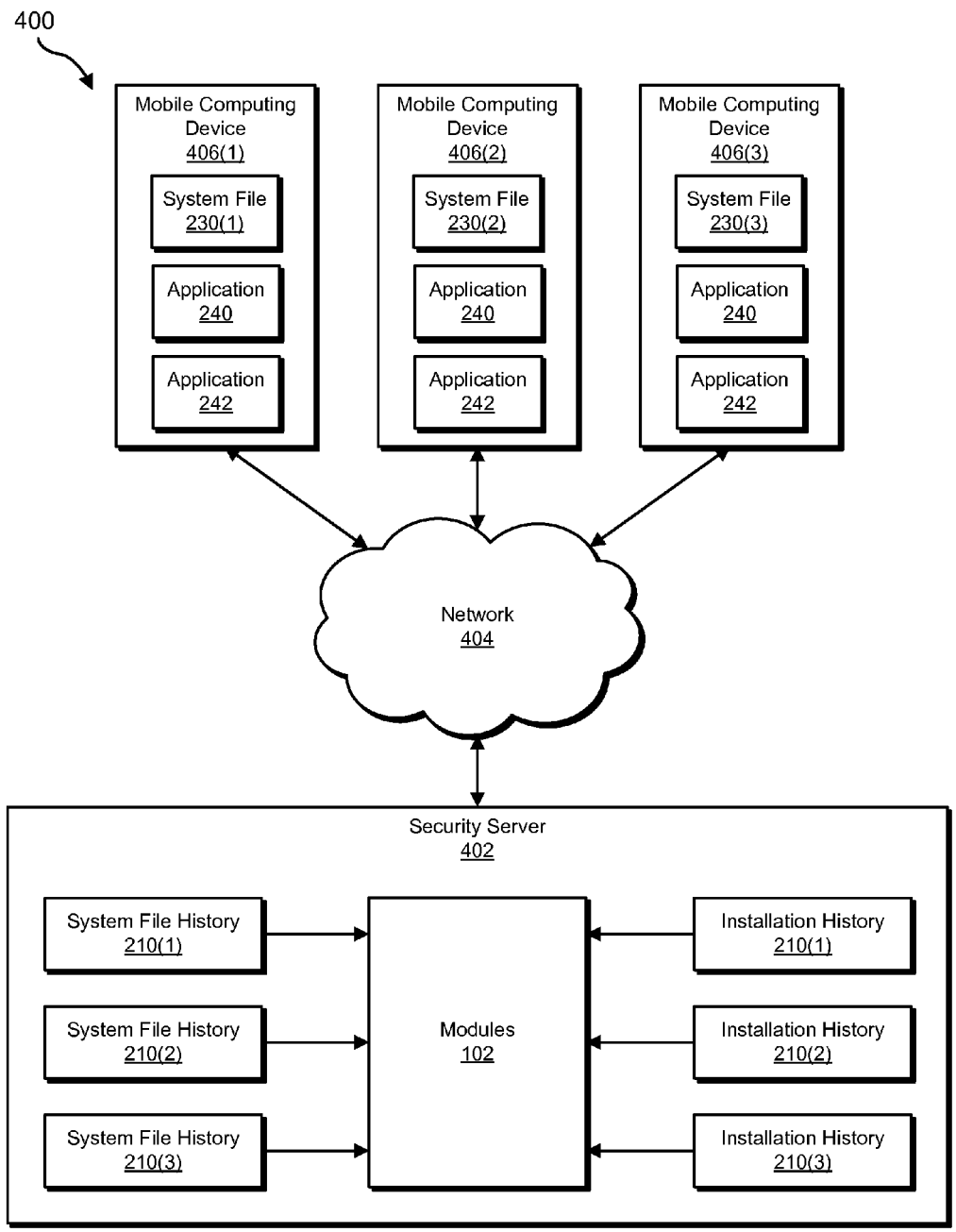
FIG. 4 is a block diagram of an exemplary system for detecting illegitimate applications.

The following will provide, with reference to FIGS. 1, 2, and 4, detailed descriptions of exemplary systems for detecting illegitimate applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting illegitimate applications. As illustrated in this figure, exemplary system 100 may include one or more modules 102 for performing one or more tasks. For example, and as will be explained in greater detail below, exemplary system 100 may include an identification module 104 programmed to identify an installation of an application on a computing system. Exemplary system 100 may also include a change module 106 programmed to determine, in response to identifying the installation of the application, that at least one system file with privileged access on the computing system has changed prior to the installation of the application.

In addition, and as will be described in greater detail below, exemplary system 100 may include a determination module 108 programmed determine that the application is illegitimate based at least in part on a time of the installation of the application relative to a time of a change to the system file. Exemplary system 100 may also include a remediation module 110 programmed to perform a remediation action on the application in response to determining that the application is illegitimate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 programmed with one or more of modules 102.

In one embodiment, one or more of modules 102 from FIG. 1 may, when executed by at least one processor of computing device 202, facilitate computing device 202 in detecting illegitimate applications (e.g., installed on computing device 202 and/or one or more computing device in communication with computing device 202). For example, and as will be described in greater detail below, one or more of modules 102 may cause computing device 202 to 1) identify an installation of an application 210 on computing device 202, 2) determine, in response to identifying the installation of application 210, that a system file 220 with privileged access on computing device 202 has changed prior to an installation time 212 of application 210, 3) determine that application 210 is illegitimate based at least in part on installation time 212 of application 210 relative to a time of a change to system file 220 (e.g., a change time 222), and 4) perform a remediation action 230 on application 210 in response to determining that application 210 is illegitimate.

Computing device 202 generally represents any type or form of computing device capable of reading computer-executable instructions. Examples of computing device 202 include, without limitation, servers, laptops, tablets, desktops, cellular phones, Personal Digital Assistants (PDAs), multimedia players, embedded systems, combinations of one or more of the same, exemplary computing system 510 in FIG. 5, or any other suitable computing device.

FIG. 3 is a flow diagram of an exemplary computer-implemented method 300 for detecting illegitimate applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an installation of an application on a computing system. For example, at step 302 identification module 104 may, as part of computing device 202 in FIG. 2, identify an installation of application 210 on computing device 202.

As used herein, the phrase "computing system" may refer to any computing device, software framework, and/or combination thereof. In some examples, the phrase "computing system" may refer to a mobile computing platform. As used herein, the phrase "mobile computing platform" may include any of a variety of mobile devices, including a mobile phone, a tablet computer, an e-book reader, a personal digital assistant, and the like. In some examples, the phrase "computing system" may refer to a system that is configured to only install and/or upgrade applications upon user input. As used herein, the term "application" may refer to any application, application package, program, module, script, daemon, and/or process that may execute on a computing system.

Identification module 104 may identify the installation of the application in any of a variety of contexts. For example, identification module 104 may identify the installation of the application by identifying an application that is installed on the computing system (e.g., by identifying one or more files of the application on the computing system). In some examples, identification module 104 may identify the installation of the application by identifying an activity of the application (e.g., by identifying the application in execution in a process list, by identifying an operation performed by the application, etc.). In some examples, identification module 104 may identify the installation of the application by identifying an installation operation. Additionally or alternatively, identification module 104 may identify an update of the application on the computing system. For example, identification module 104 may subscribe to an application installation (and/or upgrade) event of the computing system and receive a message via the event subscription indicating that the application is being and/or has been installed. Additionally or alternatively, identification module 104 may read an installation log that identifies the installation of the application.

Returning to FIG. 3, at step 304 one or more of the systems described herein may determine, in response to identifying the installation of the application, that at least one system file with privileged access on the computing system has changed prior to the installation of the application. For example, at step 304 change module 106 may, as part of computing device 202 in FIG. 2, determine, in response to identifying the installation of application 210, that system file 220 with privileged access on computing device 202 has changed prior to installation time 212 of application 210.

As used herein, the phrase "system file" may refer to any file used by an operating system in the execution of the operating system. For example, the system file may include a driver. In some examples, the phrase "system file" may refer to a file that is a part of and/or interfaces directly with an operating system kernel to contribute to the operation of the operating system. As used herein, the phrase "privileged access" may refer to any access level and/or permission that may enable, facilitate, and/or obscure an installation of an illegitimate application. For example, the privileged access may include root and/or administrator access. In some examples, the privileged access may enable and/or facilitate an installation of an application, a silent installation of an application (e.g., without user input and/or notification), and/or an installation of an unsigned and/or unverified application. In some examples, the system file may include a file in a "/system/bin" directory for an ANDROID operating system.

In some examples, change module 106 may determine the application has been installed on multiple computing systems (e.g., following system file changes). For example, change module 106 may identify a plurality of computing systems and then determine that the application was installed on each of the plurality of computing systems following a system file change on each of the plurality of file systems. As will be explained in greater detail below, in some examples, one or more of the systems described herein may determine that the application is illegitimate further based on the application being installed on multiple computing systems.

In some examples, change module 106 may determine that the system file has changed without a legitimate system update to the system file. As used herein, the phrase "legitimate system update" may refer to any update to one or more system files that is initiated, planned, and/or recommended by a trusted operating system and/or update manager. Change module 106 may determine the absence of a legitimate system update in any suitable manner. For example, change module 106 may identify an operating system build number from before the system file change and determine that the operating system build number remains unchanged after the system file change.

Change module 106 may determine that the system file has changed in any suitable manner. For example, change module 106 may 1) store an attribute of the system file prior to the installation of the application and 2) identify a current state of the attribute of the system file and determine that the attribute has changed subsequent to storing the attribute but prior to the installation of the application. Change module 106 may store any of a variety of attributes of the system file useful for determining whether the system file has changed. For example, change module 106 may store a modification time of the system file, a file size of the system file, and/or a hash of the system file (e.g., an MD5 hash and/or a SHA hash). Change module 106 may store the attribute according to any of a variety of schedules. For example, change module 106 may store the attribute in response to each identified application installation on the computing system. Additionally or alternatively, change module 106 may store the attribute periodically (e.g., once every day).

In some examples, change module 106 may determine that the system file changed prior to the installation of the application by comparing an application installation history with a system file history. For example, one or more of the systems described herein may maintain and/or identify a log of application installation times and a log of system file changes. Accordingly, change module 106 may determine that the application was the first application installed after the system file changed. Additionally or alternatively, change module 106 may determine that the application was installed within a predetermined time period (e.g., 24 hours) of the system file changing.

In some examples, change module 106 may also determine that an additional application was installed prior to the change to the system file. As will be explained in greater detail below, one or more of the systems described herein may determine that the additional application is illegitimate (e.g., that the additional application precipitated the change to the system file).

FIG. 4 illustrates an exemplary system 400 for detecting illegitimate applications. As shown in FIG. 4, exemplary system 400 may include a security server 402 in communication with mobile computing devices 406(1)-(3) via a network 404.

Network 404 generally represents any medium or architecture capable of facilitating communication or data transfer. Examples of network 404 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 404 may facilitate communication or data transfer using wireless or wired connections. In one embodiment, network 404 may facilitate communication between mobile computing devices 406(1)-(3) and security server 402.

As shown in FIG. 4, security server 402 may be programmed with one or more of modules 102. Additionally or alternatively, mobile computing devices 406(1)-(3) may be programmed with one or more of modules 102.

Using FIG. 4 as an example, change module 106 may, as a part of security server 402, receive a system file history 210 (1) and an installation history 210(1) from mobile computing device 406(1); a system file history 210(2) and an installation history 210(2) from mobile computing device 406(2); and a system file history 210(3) and an installation history 210(3) from mobile computing device 406(3). Installation history 210(1) may identify application installations on mobile computing device 406(1) (including, e.g., installation times of application 240 and application 242 on mobile computing device 406(1)). Likewise, installation history 210(2) may identify installation times of applications 240 and 242 on mobile computing device 406(2) and installation history 210 (3) may identify installation times of applications 240 and 242 on mobile computing device 406(3). System file histories 210(1), 210(2), and 210(3) may identify changes to system files 230(1), 230(2), and 230(3), respectively. For example, change module 106 may determine, by comparing installation histories 210(1), 210(2), and 210(3) with system file histories 210(1), 210(2), and 210(3), respectively, that application 242 was installed on each of mobile computing devices 406(1)-(3) directly after a change to the corresponding system files 230(1)-(3). In some examples, change module 106 may also determine that application 240 was installed on mobile computing devices 406(1)-(3) directly before the change to the corresponding system files 230(1)-(3).

Returning to FIG. 3, at step 306 one or more of the systems described herein may determine that the application is illegitimate based at least in part on a time of the installation of the application relative to a time of a change to the system file. For example, at step 306 determination module 108 may, as part of computing device 202 in FIG. 2, determine that application 210 is illegitimate based at least in part on installation time 212 of application 210 relative to a time of a change to system file 220 (e.g., change time 222).

Determination module 108 may determine that the application is irrelevant in any of a variety of ways. For example, determination module 108 may determine that the application is illegitimate based at least in part on determining that the application was the first application installed following the system file change. Additionally or alternatively, determination module 108 may determine that the application is illegitimate based at least in part on an activity level of the application relative to the time of the change to the system file. For example, determination module 108 may determine that the application is illegitimate based at least in part on the application executing within an hour of the change to the system file.

As explained earlier, in some examples, one or more of the systems described herein may have determined that the application was installed on each of a plurality of computing systems following a system file change on each of the plurality of file systems. In these examples, determination module 108 may determine that the application is illegitimate based at least in part on determining that the application was installed on each of the plurality of computing systems (e.g., in each case, after a change to a system file on the computing system). In some examples, determination module 108 may determine that the application is illegitimate based the number of the plurality of computing systems. Additionally or alternatively, determination module 108 may determine that the application is illegitimate based on a proportion of the plurality of computing systems relative to computing systems with the application installed without an associated system file change.

In some examples, determination module 108 may use a variety of additional data to determine whether the application is illegitimate. For example, determination module 108 may analyze the changed system file (e.g., performing a static and/or dynamic analysis to identify a potential contribution to the installation of the application by the changed system file (e.g., a name and/or identifier of the application stored and/or created by the changed system file). In some examples, determination module 108 may use a machine learning method to classify the application by legitimacy based on available data from the computing system.

As mentioned earlier, in some examples one or more of the systems described herein may also determine that an additional application was installed prior to the change to the system file. In these examples, determination module 108 may also determine, based at least in part on determining that the additional application was installed prior to the change to the system file, that the additional application caused the change to the system file and the installation of the application. For example, the additional application may have used a root exploit to change the system file and thereby gain root access to install the application.

Returning to FIG. 3, at step 308 one or more of the systems described herein may perform a remediation action on the application in response to determining that the application is illegitimate. For example, at step 308 remediation module 110 may, as part of computing device 202 in FIG. 2, perform remediation action 230 on application 210 in response to determining that application 210 is illegitimate.

Remediation module 110 may perform any of a variety of remediation actions on the application. For example, remediation module 110 may uninstall, delete, and/or quarantine the application. In some examples, remediation module 110 may catalog the application as an illegitimate application (e.g., create a fingerprint of the application). Additionally or alternatively, remediation module 110 may store an association between the system file and the application (e.g., to more easily identify variants of the illegitimate application in the future). In some examples, remediation module 110 may reverse an update performed on the application (e.g., that brought the application to an illegitimate state and/or version).

As explained above, by identifying applications installed in proximity to (and/or active in proximity to) unexpected changes to system files, the systems and methods described herein may identify malicious applications that may be installed without a user's knowledge and/or without detection by traditional signature-based and/or heuristic methods for identifying malware. Additionally or alternatively, in some examples these systems and methods may identify a malicious rooting of a computing system and/or a malicious application that enabled the malicious rooting, thereby leading to the installation of additional illegitimate applications.

Figure 5:
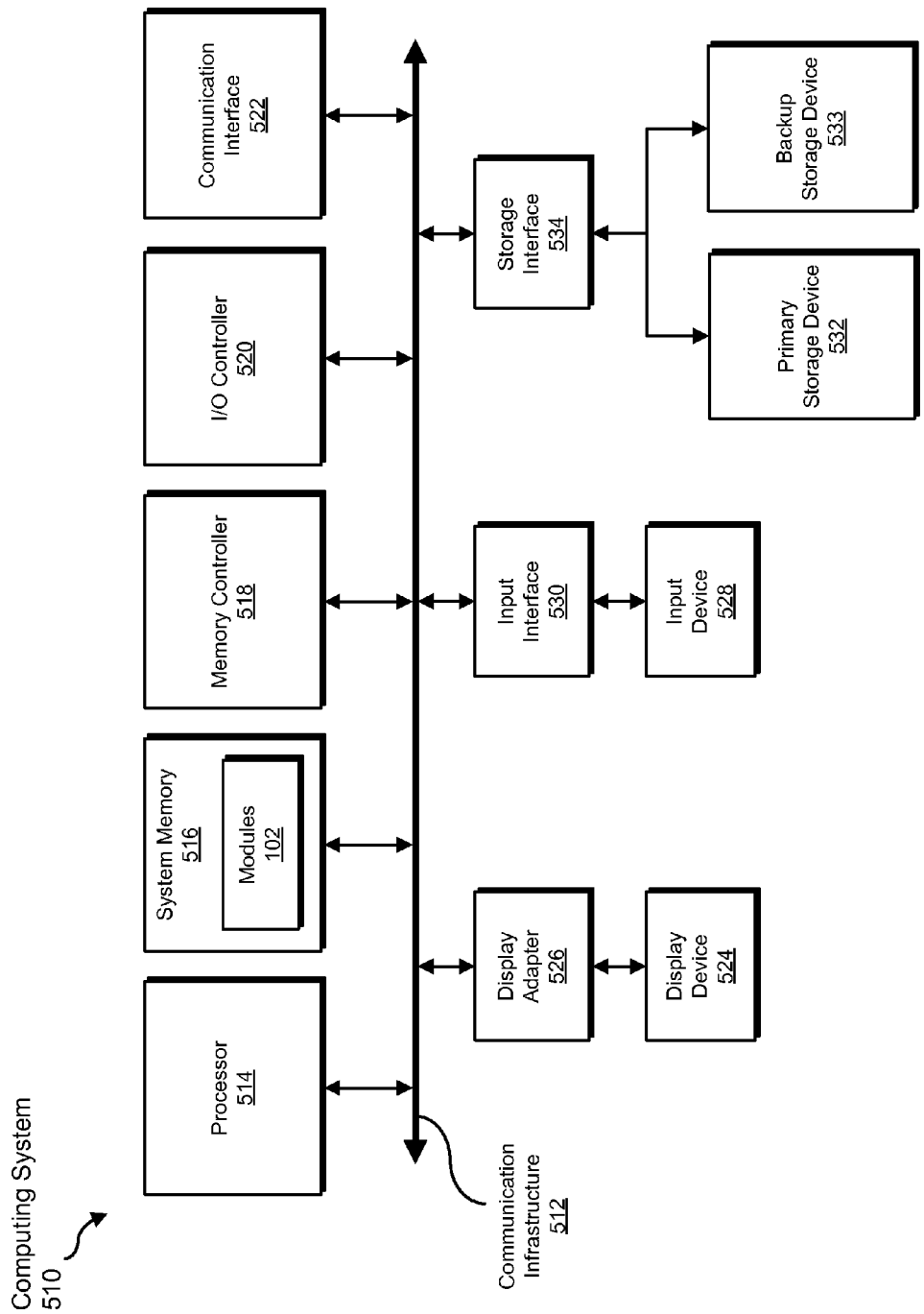
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, storing, and performing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
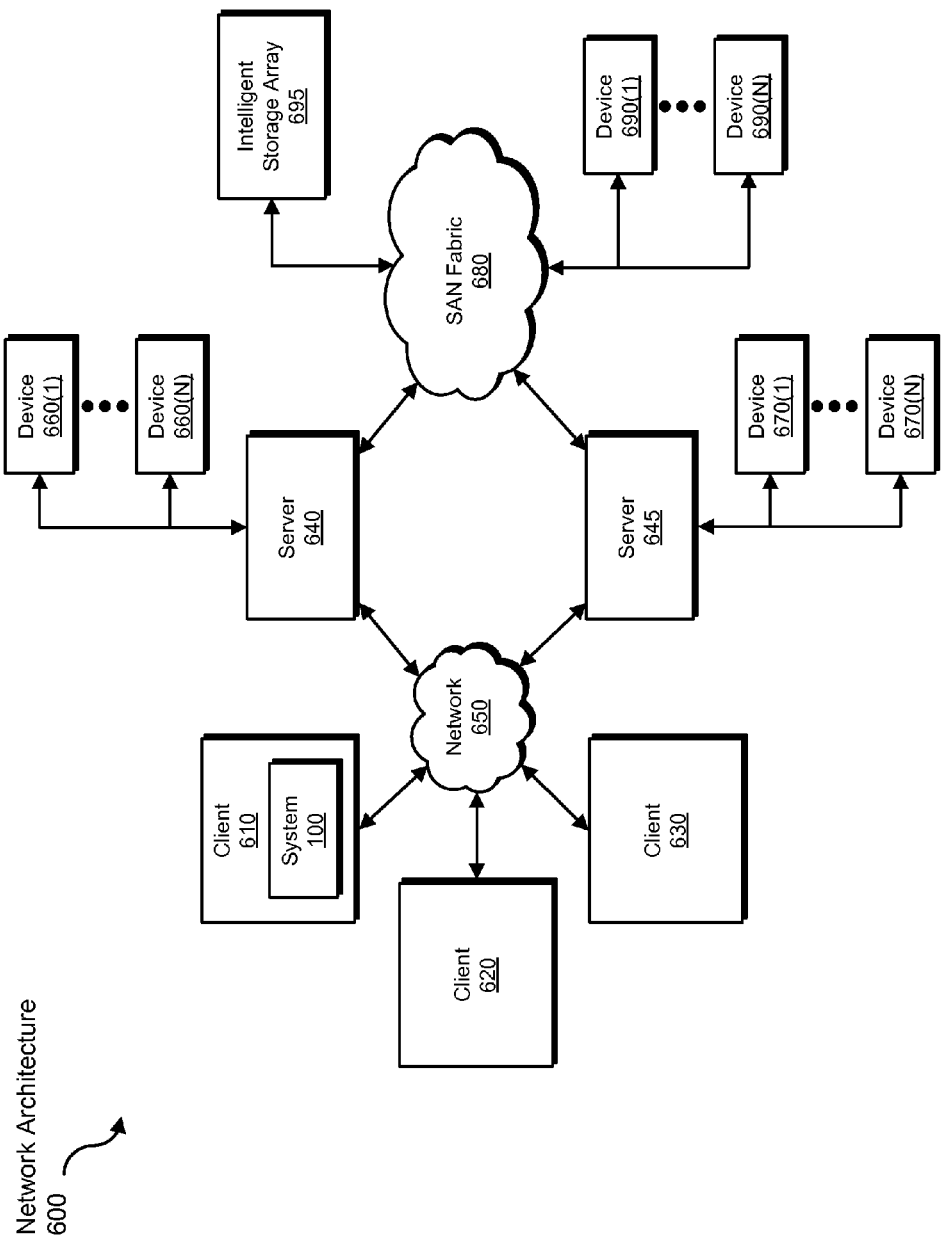
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, storing, and performing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting illegitimate applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data about system file changes and application installations to be transformed, transform the data, use the result of the transformation to classify an application as illegitimate, and store the result of the transformation to a malware database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting illegitimate applications, at least a portion of the method being performed by a computing device comprising at least one processor, the method comprising:
   identifying an installation of an application on a computing system;
   determining, in response to identifying the installation of the application, that at least one system file with privileged access on the computing system was unexpectedly changed prior to the installation of the application, wherein the privileged access comprises an access level that may enable installation of illegitimate applications;
   determining that the application is illegitimate based at least in part on the application being installed after the system file with privileged access was changed;
   performing a remediation action on the application in response to determining that the application is illegitimate.

2. The computer-implemented method of claim 1, further comprising:
   identifying a plurality of computing systems;
   determining that the application was installed on each of the plurality of computing systems following a system file change on each of the plurality of computing systems;

wherein determining that the application is illegitimate is further based on determining that the application was installed on each of the plurality of computing systems.

3. The computer-implemented method of claim 1, wherein determining that the system file was changed further comprises determining that the system file changed without a legitimate system update to the system file.

4. The computer-implemented method of claim 1, wherein determining that the application is illegitimate is further based on an activity level of the application relative to the time of the change to the system file.

5. The computer-implemented method of claim 1, wherein identifying the installation of the application on the computing system comprises identifying an update of the application on the computing system.

6. The computer-implemented method of claim 1, wherein determining that the system file was changed prior to the installation of the application comprises:
storing an attribute of the system file prior to the installation of the application;
identifying a current state of the attribute of the system file and determining that the attribute has changed subsequent to storing the attribute but prior to the installation of the application.

7. The computer-implemented method of claim 1, further comprising:
determining that an additional application was installed prior to the change to the system file;
determining, based at least in part on determining that the additional application was installed prior to the change to the system file, that the additional application caused the change to the system file and the installation of the application.

8. The computer-implemented method of claim 1, wherein determining that the system file with privileged access on the computing system was changed prior to the installation of the application comprises comparing an application installation history with a system file history.

9. A system for detecting illegitimate applications, the system comprising:
an identification module programmed to identify an installation of an application on a computing system;
a change module programmed to determine, in response to identifying the installation of the application, that at least one system file with privileged access on the computing system was unexpectedly changed prior to the installation of the application, wherein the privileged access comprises an access level that may enable installation of illegitimate applications;
a determination module programmed to determine that the application is illegitimate based at least in part on the application being installed after the system file with privileged access was changed;
a remediation module programmed to perform a remediation action on the application in response to determining that the application is illegitimate;
at least one processor configured to execute the identification module, the change module, the determination module, and the remediation module.

10. The system of claim 9,
wherein the change module is further programmed to:
identify a plurality of computing systems;
determine that the application was installed on each of the plurality of computing systems following a system file change on each of the plurality of computing systems;
wherein the determination module is programmed to determine that the application is illegitimate further based on determining that the application was installed on each of the plurality of computing systems.

11. The system of claim 9, wherein the change module is programmed to determine that the system file was changed by determining that the system file changed without a legitimate system update to the system file.

12. The system of claim 9, wherein the determination module is programmed to determine that the application is illegitimate further based on an activity level of the application relative to the time of the change to the system file.

13. The system of claim 9, wherein the identification module is programmed to identify the installation of the application on the computing system by identifying an update of the application on the computing system.

14. The system of claim 9, wherein the change module is programmed to determine that the system file was changed prior to the installation of the application by:
storing an attribute of the system file prior to the installation of the application;
identifying a current state of the attribute of the system file and determining that the attribute has changed subsequent to storing the attribute but prior to the installation of the application.

15. The system of claim 9, wherein:
the change module is further programmed to determine that an additional application was installed prior to the change to the system file;
the determination module is further programmed to determine, based at least in part on determining that the additional application was installed prior to the change to the system file, that the additional application caused the change to the system file and the installation of the application.

16. The system of claim 9, wherein the change module is programmed to determine that the system file with privileged access on the computing system was changed prior to the installation of the application by comparing an application installation history with a system file history.

17. A non-transitory computer-readable medium comprising one or more computer-executable instructions that, when executed by at least one processor of a computing device, cause the computing device to:
identify an installation of an application on a computing system;
determine, in response to identifying the installation of the application, that at least one system file with privileged access on the computing system was unexpectedly changed prior to the installation of the application, wherein the privileged access comprises an access level that may enable installation of illegitimate applications;
determine that the application is illegitimate based at least in part on the application being installed after the system file with privileged access was changed;
perform a remediation action on the application in response to determining that the application is illegitimate.

18. The non-transitory computer-readable medium of claim 17,
wherein the one or more computer-executable instructions further cause the computing device to:
identify a plurality of computing systems;
determine that the application was installed on each of the plurality of computing systems following a system file change on each of the plurality of computing systems;

wherein the one or more computer-executable instructions cause the computing device to determine that the application is illegitimate further based on determining that the application was installed on each of the plurality of computing systems.

19. The non-transitory computer-readable medium of claim 17, wherein the one or more computer-executable instructions cause the computing device to determine that the system file was changed by causing the computing device to determine that the system file changed without a legitimate system update to the system file.

20. The non-transitory computer-readable medium of claim 17, wherein the one or more computer-executable instructions cause the computing device to determine that the application is illegitimate further based on an activity level of the application relative to the time of the change to the system file.

* * * * *